(12) United States Patent
Tenner et al.

(10) Patent No.: US 7,200,619 B2
(45) Date of Patent: Apr. 3, 2007

(54) METHOD AND PROCESS TO OPTIMIZE CORRELATION OF REPLICATED WITH EXTRACTED DATA FROM DISPARATE DATA SOURCES

(75) Inventors: Jeffrey Wayne Tenner, Rochester, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 10/161,251

(22) Filed: May 31, 2002

(65) Prior Publication Data

US 2003/0225742 A1 Dec. 4, 2003

(51) Int. Cl.
*G06F 17/30* (2006.01)
*G06F 15/16* (2006.01)

(52) U.S. Cl. ........................ 707/201; 707/202; 709/200
(58) Field of Classification Search .................... 707/3, 707/201; 713/100
See application file for complete search history.

(56) References Cited

U.S. PATENT DOCUMENTS

| 5,884,324 A | 3/1999 | Cheng et al. |
| 6,263,433 B1 | 7/2001 | Robinson et al. |
| 6,725,227 B1 | 4/2004 | Li |
| 2002/0133508 A1* | 9/2002 | LaRue et al. ............... 707/202 |
| 2003/0154194 A1* | 8/2003 | Jonas ........................... 707/3 |

* cited by examiner

*Primary Examiner*—Jeffrey Gaffin
*Assistant Examiner*—Hassan Mahmoudi
(74) *Attorney, Agent, or Firm*—Patterson & Sheridan, LLP

(57) ABSTRACT

A method, a data structure, a computer program product and a computer-readable medium for correlating at least a first plurality of data records and a second plurality of data records, each data record of the first plurality of data records being uniquely identified within a corresponding data source by an associated internal identifier and each data record of the first and second plurality of data records comprising at least one external identifier. According to one embodiment, the method comprises determining a data record of the first plurality of data records and at least one data record of the second plurality of data records having an identical external identifier; and mapping the at least one determined data record of the second plurality of data records to the internal identifier associated with the determined data record of the first plurality of data records.

33 Claims, 27 Drawing Sheets

CC_Transaction 620

| Transaction Number 622 | Account Internal Key 624 | Date 626 | Price 628 |
|---|---|---|---|
| 500 | 1 | 4/5/2002 | $10.00 |
| 501 | 3 | 4/5/2002 | $533.50 |
| 502 | 5 | 4/5/2002 | $25.21 |
| 503 | 1 | 4/6/2002 | $701.12 |
| 504 | 3 | 4/6/2002 | $13.52 |
| 505 | 6 | 4/6/2002 | $77.79 |

FIG. 6B

CC_Customer 630

| Account Internal Key | Name | Address | City | State |
|---|---|---|---|---|
| 1 | John Smith | 111 Main | New York | NY |
| 2 | Mike Peterson | 202 Broadway | Rochester | MN |
| 3 | Julie Johnson | 555 5th Ave | San Jose | CA |
| 4 | Jack Lattern | 666 7th St | Eirie | PA |
| 5 | Donna Jackson | 808 Washington | Milwaukee | WI |
| 6 | Bill Smith | 512 3rd St | Dallas | TX |

R_Account 712 714

| Account Internal Key | Reward Card # |
|---|---|
| 101 | 777777770011 |
| 102 | 222222220011 |
| 103 | 888888880011 |
| 104 | 000000000011 |
| 105 | 555555550011 |
| 106 | 444444440011 |

R_Transaction

| Transaction Number | Account Internal Key | Points | Date |
|---|---|---|---|
| 21 | 101 | 10 | 4/5/2002 |
| 22 | 102 | 500 | 4/5/2002 |
| 23 | 104 | 25 | 4/5/2002 |
| 24 | 101 | 500 | 4/6/2002 |
| 25 | 102 | 10 | 4/6/2002 |
| 26 | 105 | 70 | 4/6/2002 |
| 27 | 106 | 500 | 4/7/2002 |

FIG. 7B

R_Account

| Account Internal Key | Reward Card # |
|---|---|
| 101 | 777777770011 |
| 102 | 222222220011 |
| 103 | 888888880011 |
| 104 | 000000000011 ← 830 |
| 105 | 555555550011 |
| 106 | 444444440011 |

WH_Mapping

| WHKEY | EXTID | XTRCT1KEY |
|---|---|---|
| 1 | 777777770011 | 101 |
| 2 | 333333330011 | null ← 822 |
| 3 | 222222220011 | 102 |
| 4 | 888888880011 | 103 |
| 5 | 111111110011 | 104 ← 826 |
| 6 | 555555550011 | 105 |
| 5G+106 | 444444440011 | 106 ← 824 |

FIG. 8B

R_Transaction

| Transaction Number | Account Internal Key | Points | Date |
|---|---|---|---|
| 21 | 1 | 10 | 4/5/2002 |
| 22 | 2 | 500 | 4/5/2002 |
| 23 | 5 | 25 | 4/5/2002 |
| 24 | 1 | 500 | 4/6/2002 |
| 25 | 3 | 10 | 4/6/2002 |
| 26 | 6 | 70 | 4/6/2002 |
| 27 | 5G+106 | 500 | 4/7/2002 |

FIG. 9A

CC_Account History

| Account Internal Key | Past Credit Card # |
|---|---|
| 5 | 000000000011 |

640 →

CC_Account

| Account Internal Key | Credit Card # |
|---|---|
| 1 | 777777770011 |
| 2 | 333333330011 |
| 3 | 222222220011 |
| 4 | 888888880011 |
| 5 | 111111110011 |
| 6 | 555555550011 |

610 →

WH_Mapping

| WHKEY | EXTID | XTRCT1KEY |
|---|---|---|
| 1 | 777777770011 | 101 |
| 2 | 333333330011 | null |
| 3 | 222222220011 | 102 |
| 4 | 888888880011 | 103 |
| 5 | 111111110011 | 104 |
| 6 | 555555550011 | 105 |
| 5G+106 | 444444440011 | 106 |

CC_Transaction 624

| Transaction Number | Account Internal Key | Date | Price |
|---|---|---|---|
| 500 | 1 | 4/5/2002 | $10.00 |
| 501 | 3 | 4/5/2002 | $533.50 |
| 502 | 5 | 4/5/2002 | $25.21 |
| 503 | 1 | 4/6/2002 | $701.12 |
| 504 | 3 | 4/6/2002 | $13.52 |
| 505 | 6 | 4/6/2002 | $77.79 |

620

CC_Customer

| Account Internal Key | Name | Address | City | State |
|---|---|---|---|---|
| 1 | John Smith | 111 Main | New York | NY |
| 2 | Mike Peterson | 202 Broadway | Rochester | MN |
| 3 | Julie Johnson | 555 5th Ave | San Jose | CA |
| 4 | Jack Lattern | 666 7th St | Eirie | PA |
| 5 | Donna Jackson | 808 Washington | Milwaukee | WI |
| 6 | Bill Smith | 512 3rd St | Dallas | TX |

R_Customer

| Account Internal Key | Name | Address | City | State |
|---|---|---|---|---|
| 1 | John Smith | 111 Main | New York | NY |
| 3 | Julie Johnson | 555 5th Ave | San Jose | CA |
| 4 | Jack Lattern | 666 7th St | Eirie | PA |
| 5 | Donna Jackson | 808 Washington | Milwaukee | WI |
| 6 | Bill Smith | 512 3rd St | Dallas | TX |
| 56+106 | Jeff Corvette | 1212 12th Ave | Trenton | NJ |

R_Transaction

| Transaction Number | Account Internal Key | Points | Date |
|---|---|---|---|
| 21 | 1 | 10 | 4/5/2002 |
| 22 | 2 | 500 | 4/5/2002 |
| 23 | 5 | 25 | 4/5/2002 |
| 24 | 1 | 500 | 4/6/2002 |
| 25 | 3 | 10 | 4/6/2002 |
| 26 | 6 | 70 | 4/6/2002 |
| 27 | 5G+10G | 500 | 4/7/2002 |

FIG. 10A

CC_Account History

| Account Internal Key | Past Credit Card # |
|---:|---:|
| 5 | 000000000011 |
| 6 | 555555550011 | ←1042

1040

CC_Account

| Account Internal Key | Credit Card # |
|---:|---:|
| 1 | 777777770011 |
| 2 | 333333330011 |
| 3 | 222222220011 |
| 4 | 888888880011 |
| 5 | 111111110011 |
| 6 | 999999990011 | ←1012
| 7 | 121212120011 | ←1014

1010

WH_Mapping

| WHKEY | EXTID | XTRCT1KEY |
|---:|---:|---:|
| 1 | 777777770011 | 101 |
| 2 | 333333330011 | null |
| 3 | 222222220011 | 102 |
| 4 | 888888880011 | 103 |
| 5 | 111111110011 | 104 |
| 6 | 999999990011 | 105 | ←1052
| 5G+106 | 444444440011 | 106 |
| 7 | 121212120011 | null | ←1054

CC_Transaction

| Transaction Number | Account Internal Key | Date | Price |
|---|---|---|---|
| 500 | 1 | 4/5/2002 | $10.00 |
| 501 | 3 | 4/5/2002 | $533.50 |
| 502 | 5 | 4/5/2002 | $25.21 |
| 503 | 1 | 4/6/2002 | $701.12 |
| 504 | 3 | 4/6/2002 | $13.52 |
| 505 | 6 | 4/6/2002 | $77.79 |
| 506 | 7 | 4/7/2002 | $123.99 |

↙1020                                                              ↖1022

CC_Customer

| Account Internal Key | Name | Address | City | State |
|---|---|---|---|---|
| 1 | John Smith | 111 Main | New York | NY |
| 2 | Mike Peterson | 202 Broadway | Rochester | MN |
| 3 | Julie Johnson | 555 5th Ave | San Jose | CA |
| 4 | Jack Lattern | 666 7th St | Eirle | PA |
| 5 | Donna Jackson | 808 Washington | Milwaukee | WI |
| 6 | Bill Smith | 512 3rd St | Dallas | TX |
| 7 | Lynn Nelson | 5900 Back St | Detroit | MI |

R_Customer

| Account Internal Key | Name | Address | City | State |
|---|---|---|---|---|
| 1 | John Smith | 111 Main | New York | NY |
| 3 | Julie Johnson | 555 5th Ave | San Jose | CA |
| 4 | Jack Lattern | 666 7th St | Eirie | PA |
| 5 | Donna Jackson | 808 Washington | Milwaukee | WI |
| 6 | Bill Smith | 512 3rd St | Dallas | TX |
| 5G+10G | Jeff Corvette | 1212 12th Ave | Trenton | NJ |

R_Transaction

| Transaction Number | Account Internal Key | Points | Date |
|---|---|---|---|
| 21 | 1 | 10 | 4/5/2002 |
| 22 | 2 | 500 | 4/5/2002 |
| 23 | 5 | 25 | 4/5/2002 |
| 24 | 1 | 500 | 4/6/2002 |
| 25 | 3 | 10 | 4/6/2002 |
| 26 | 6 | 70 | 4/6/2002 |
| 27 | 5G+106 | 500 | 4/7/2002 |

FIG. 11A

CC_Account History

| Account Internal Key | Past Credit Card # |
|---|---|
| 5 | 000000000011 |
| 6 | 555555550011 |

1040

R_Account

| Account Internal Key | Reward Card # |
|---|---|
| 101 | 777777770011 |
| 102 | 222222220011 |
| 103 | 888888880011 |
| 104 | 111111110011 |
| 105 | 555555550011 |
| 106 | 444444440011 |
| 107 | 121212120011 |
| 108 | 131313130011 |

1110

← 1112
← 1114
← 1116

WH_Mapping

| WHKEY | EXTID | XTRCT1KEY |
|---|---|---|
| 1 | 777777770011 | 101 |
| 2 | 333333330011 | null |
| 3 | 222222220011 | 102 |
| 4 | 888888880011 | 103 |
| 5 | 111111110011 | 104 |
| 6 | 999999990011 | 105 |
| 5G+106 | 444444440011 | 106 |
| 7 | 121212120011 | 107 |
| 5G+108 | 131313130011 | 108 |

CC_Transaction

| Transaction Number | Account Internal Key | Date | Price |
|---|---|---|---|
| 500 | 1 | 4/5/2002 | $10.00 |
| 501 | 3 | 4/5/2002 | $533.50 |
| 502 | 5 | 4/5/2002 | $25.21 |
| 503 | 1 | 4/6/2002 | $701.12 |
| 504 | 3 | 4/6/2002 | $13.52 |
| 505 | 6 | 4/6/2002 | $77.79 |
| 506 | 7 | 4/7/2002 | $123.99 |

CC_Customer

| Account Internal Key | Name | Address | City | State |
|---|---|---|---|---|
| 1 | John Smith | 111 Main | New York | NY |
| 2 | Mike Peterson | 202 Broadway | Rochester | MN |
| 3 | Julie Johnson | 555 5th Ave | San Jose | CA |
| 4 | Jack Lattern | 666 7th St | Eirie | PA |
| 5 | Donna Jackson | 808 Washington | Milwaukee | WI |
| 6 | Bill Smith | 512 3rd St | Dallas | TX |
| 7 | Lynn Nelson | 5900 Back St | Detroit | MI |

FIG. 11C

R_Customer 1130

| Account Internal Key | Name | Address | City | State |
|---|---|---|---|---|
| 1 | John Smith | 111 Main | New York | NY |
| 3 | Julie Johnson | 555 5th Ave | San Jose | CA |
| 4 | Jack Lattern | 666 7th St | Eirie | PA |
| 5 | Donna Jackson | 808 Washington | Milwaukee | WI |
| 6 | Bill Smith | 512 3rd St | Dallas | TX |
| 56+106 | Jeff Corvette | 1212 12th Ave | Trenton | NJ |
| 7 | Lynn Nelson | 5900 Back St | Detroit | MI |
| 56+108 | Mike Golding | 5844 61st St | Houston | TX |

1132 → (State column, MI row)
1134 → (State column, TX row)

FIG. 11D

METHOD AND PROCESS TO OPTIMIZE CORRELATION OF REPLICATED WITH EXTRACTED DATA FROM DISPARATE DATA SOURCES

BACKGROUND OF THE INVENTION

1. Field of the Invention

The present invention generally relates to correlating different data sources and, more particularly, to correlating data from at least two different data sources in a data warehouse.

2. Description of the Related Art

Computerized information storage and retrieval systems made up of a (possibly large) number of files or tables are available in form of databases. The most prevalent type of database is the relational database, a tabular database in which data is defined so that it can be reorganized and accessed in a number of different ways. Storing and retrieving data in a database is performed by means of a computer database management system (DBMS).

Regardless of the particular architecture, in a DBMS, a requesting entity (e.g., an application, the operating system or a user) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL).

A relational database management system (RDBMS) is a DBMS that uses relational techniques for storing and retrieving data. RDBMS software using a SQL interface is well known in the art. The SQL interface has evolved into a standard language for RDBMS software and has been adopted as such by both the American National Standards Institute (ANSI) and the International Standards Organization (ISO).

Illustratively, SQL is used to make interactive queries for getting information from and updating a database such as International Business Machines' (IBM®) DB2®, Microsoft's SQL Server®, and database products from Oracle®, Sybase®, and Computer Associates®. The term "query" denominates a set of commands for retrieving and processing data from a stored database. Queries take the form of a command language that lets programmers and programs select, insert, update, find out the location of data, and so forth.

Data records in a computerized RDBMS are maintained in tables, which are a collection of rows all having the same columns. Each row represents a data record and each column maintains information on a particular type of data for the data records that comprise the rows. Data records may be indexed using unique indices or keys to join different data records in different related tables together. A preferred model is for the keys to be internal numeric identifiers that can be assigned incrementally, rather than directly mapping the data records to some external identifier.

An internal identifier is an identifier that is generated by means of the RDBMS or application and is used to correlate information across tables of the application. Internal identifiers are not externalized outside the application. An external identifier is an identifier that may be generated by means of the RDBMS or application or supplied by the end-user and uniquely identifies a corresponding entity in the real world. Assume that in a credit card transaction system of a financial institution, a data record is generated for each client in a table comprising information related to the clients, each data record representing a row of the table. Assume further that the table comprises a plurality of columns, i.e. last name, middle initial, first name, street, city, state, ZIP code and credit card number. Each data record thus contains information related to one client, i.e., last name, middle initial, first name, street, city, state, ZIP code and credit card number of the client. To uniquely identify each data record, in general, a 32-bit integer is generated by means of the RDBMS or application as internal identifier and stored in an additional column of the table. However, this internal identifier does not comprise relevant information regarding the corresponding client and may only be used to uniquely identify the data record related to this client. In contrast thereto, the credit card number, which has not been generated by means of the RDBMS, and which is located in each data record, also uniquely identifies the corresponding data record and client and represents an external identifier in that the client is aware of this number and uses it to identify him or herself.

Where internal identifiers are used, a mapping table may be provided to map internal identifiers to their respective external identifier. Accessing tables associated with an external identifier is then accomplished by using the external identifier to index into the mapping table and locate the corresponding internal identifier. The internal identifier is then used as a key to access the relevant tables. Assignment of a new external identifier for a data record in a table (e.g., TABLE 1) can be handled simply by changing the relevant row of the mapping table to map the new external identifier to the corresponding internal identifier of TABLE 1. A history of external identifiers can be kept in a history mapping table which maps past external identifiers to the internal identifier. In this manner, a single unchanging internal identifier can be used to access all data associated with any number of related external identifiers.

To illustrate the advantages of using an internal identifier as a key, consider in the above described example the assignment of a new credit card number (a new external identifier) to replace the old credit card number (the old external identifier) of a card that was lost or stolen. The data for the card account, such as credit history and balances, must still be associated with the same entity (e.g., client). As a result, if the old external identifier, i.e., the old credit card number was used as the key across the tables, all tables using the old external identifier to uniquely identify corresponding data records and thus containing references to the old credit card number would have to be updated to reflect the new external identifier, i.e., the new credit card number. Dependent on the number of tables to be updated, this may, however, be complex and cumbersome. Additionally, by simply replacing the old credit card number with the new credit card number, history about the old credit card number(s) for the entity's account is lost, as no link between the old and the corresponding new credit card number could be established. In order to avoid loss of history of the external identifiers, a history mapping table or a new column in one of the updated tables must be created, which maps the old external identifier to the new external identifier, i.e., the old credit card number to the new credit card number. In contrast thereto, there is no need to change an internal identifier used as the key across the tables, as the internal identifier is used within a corresponding database for uniquely identifying and joining data records, so that, for example, only one entry in a corresponding history mapping table needs to be updated to map the old credit card number to the new credit card number.

Although using internal identifiers in the foregoing manner simplifies maintenance of relational databases, it complicates construction of a data warehouse. By definition, data warehouses pull together data from different data sources and try to establish correlations between them. Thus, queries may directly be run on the data stored in the data warehouse so that the performance of the computer system that issues the data required to satisfy a corresponding query will not be affected.

In constructing a data warehouse, data from many different databases, each using their own method for generating unique internal identifiers, have to be correlated. Continuing with the credit card example and assume that the financial institution offering the credit card also has a rewards program for using the card which uses the credit card number as the external identifier for the rewards program. Assume further that the credit card transaction system is written by a different software vendor than the rewards tracking program. Since the external identifier, i.e., the credit card number is common to both data sources, it would seem logical to use it to correlate the data from the two data sources when constructing a data warehouse on the basis of these data sources. However, such correlation would require adding the credit card number as a key to the tables copied to the data warehouse or always joining the tables in the data warehouse via some mapping table.

Adding the external identifier as a key also introduces the problem described earlier where changes to the credit card number can require changes across many tables in the data warehouse. The problems with using external identifiers as keys are compounded because, in the data warehouse, data from one data source or application may be using a newer external identifier than another application(s) during the window of time that the applications are updated. Further, performing a join with some mapping table can severely impact the performance of queries against the database. To complicate matters further, many times data in a data warehouse must also be correlated back to the original data source to allow capturing of changes of the original data source.

A recent trend is building data warehouses with real-time data. In some cases, such data warehouses consist of some or all of the data being replicated to the data warehouse rather than more traditional extract-transform-load processes. In general, replicating data represents moving data from the original data source to the data warehouse, wherein only changes are copied, but not the whole data. In the extract-transform-load processes, extracted data is typically entirely copied, i.e., converted/transformed and processed during the extract process according to the requirements of a corresponding data warehouse and has more freedom to change values as long as some method to map the data back to the original data source exists to allow incremental updates. In contrast, replicated data is merely copied without transformation. As a result, the internal identifier values for replicated data cannot be changed when moved to the data warehouse.

Accordingly, there is a need for a more efficient and effective technique for correlating different data sources in a data warehouse.

SUMMARY OF THE INVENTION

The present invention generally relates to correlating different data sources and, more particularly, to correlating data from at least two different data sources in a data warehouse.

One aspect of the present invention relates to a computer-readable medium comprising computer-executable instructions which, when executed, perform an operation of correlating at least a first plurality of data records and a second plurality of data records, each data record of the first plurality of data records being uniquely identified within a corresponding data source by an associated internal identifier and each data record of the first and second plurality of data records comprising at least one external identifier. The operation comprises: determining a data record of the first plurality of data records and at least one data record of the second plurality of data records having an identical external identifier; and mapping the at least one determined data record of the second plurality of data records to the internal identifier associated with the determined data record of the first plurality of data records.

Another aspect of the present invention relates to a computer-readable medium comprising computer-executable instructions which, when executed, perform an operation of creating a data warehouse mapping data structure to correlate at least two different data sources. The operation comprises creating a plurality of mapping data records in the warehouse mapping data structure. Each mapping data record comprises: a first value representing an internal identifier uniquely identifying the mapping data record in the warehouse mapping data structure; a second value representing an external identifier of one of a data record of a first data source and a data record of a second data source; and a third value representing an internal identifier uniquely identifying a data record of the second data source in the second data source, the data record of the second data source having the second value as external identifier; whereby a correlation between the first and the second data sources is established.

Another aspect of the present invention relates to a computer-readable medium comprising computer-executable instructions which, when executed, perform an operation of correlating data from at least two different data sources in a data warehouse. The operation comprises: loading data from a first data source into the data warehouse, the data from the first data source comprising a plurality of first internal identifiers and a plurality of first external identifiers; creating a warehouse mapping data structure on the basis of the plurality of internal identifiers each mapped to an associated first external identifier; loading data from a second data source into the data warehouse, the data from the second data source comprising a plurality of second internal identifiers each associated with a second external identifier, wherein at least one of the associated second external identifiers is identical to one of the first external identifiers; and mapping each second internal identifier associated with a second external identifier that is identical to one of the first external identifiers in the warehouse mapping data structure to the first internal identifier of the identical matching first external identifier, whereby a correlation between data of the first and the second data sources is established.

Another aspect of the present invention relates to a method of correlating at least a first plurality of data records and a second plurality of data records, each data record of the first plurality of data records being uniquely identified within a corresponding data source by an associated internal identifier and each data record of the first and second plurality of data records comprising at least one external identifier. The method comprises: determining a data record of the first plurality of data records and at least one data record of the second plurality of data records having an identical external identifier; and mapping the at least one determined data record of the second plurality of data records to the internal identifier associated with the determined data record of the first plurality of data records.

Another aspect of the present invention relates to a method of creating a data warehouse mapping data structure to correlate at least two different data sources. The method comprises creating a plurality of mapping data records in the warehouse mapping data structure. Each mapping data record comprises: a first value representing an internal identifier uniquely identifying the mapping data record in the warehouse mapping data structure; a second value representing an external identifier of one of a data record of a first data source and a data record of a second data source; and a third value representing an internal identifier uniquely identifying a data record of the second data source in the second data source, the data record of the second data source having the second value as external identifier; whereby a correlation between the first and the second data sources is established.

Another aspect of the present invention relates to a method of correlating data from at least two different data sources in a data warehouse. The method comprises: loading data from a first data source into the data warehouse, the data from the first data source comprising a plurality of first internal identifiers and a plurality of first external identifiers; creating a warehouse mapping data structure on the basis of the plurality of internal identifiers each mapped to an associated first external identifier; loading data from a second data source into the data warehouse, the data from the second data source comprising a plurality of second internal identifiers each associated with a second external identifier, wherein at least one of the associated second external identifiers is identical to one of the first external identifiers; and mapping each second internal identifier associated with a second external identifier that is identical to one of the first external identifiers in the warehouse mapping data structure to the first internal identifier of the identical matching first external identifier, whereby a correlation between data of the first and the second data sources is established.

Another aspect of the present invention relates to a mapping data structure residing in storage. The mapping data structure comprises a plurality of data records. Each data record comprises: a first portion comprising a warehouse internal identifier; a second portion comprising an external identifier common to a first data source and a second data source; and a third portion comprising an internal identifier of the second data source; wherein at least one data record of the plurality of data records comprises a warehouse internal identifier representing an internal identifier of the first data source, a common external identifier associated with the internal identifier of the first data source and an internal identifier of the second data source associated with the common external identifier, whereby a correlation between data of the first and the second data sources is established.

Another aspect of the present invention relates to a warehouse mapping table residing in storage. The warehouse mapping table comprises a plurality of external identifiers common to a first data source and a second data source, a warehouse internal identifier for each of the plurality of external identifiers, and an internal identifier of the second data source for a least a portion of each of the warehouse internal identifiers, whereby data from the first and second data sources is correlated.

Another aspect of the present invention relates to a computer comprising a memory and a processor adapted to execute contents of the memory. The memory contains at least: a database management system; a data warehouse for storing data of a first and a second data source; and a mapping data structure for correlating the data of the first and second data sources in the data warehouse, the mapping data structure comprising a plurality of data records. Each data record in the mapping data structure comprises: a first portion comprising a warehouse internal identifier; a second portion comprising an external identifier common to a first data source and a second data source; and a third portion comprising an internal identifier of the second data source; wherein at least one data record of the plurality of data records comprises a warehouse internal identifier representing an internal identifier of the first data source, a common external identifier associated with the internal identifier of the first data source and an internal identifier of the second data source associated with the common external identifier.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 6A–C are relational views of exemplary components of a first data source;

FIGS. 7A–C are relational views of exemplary components of a second data source;

FIGS. 8A–B are relational views of exemplary components of a first and second data source used to create a mapping data structure;

FIGS. 9A–D are relational views of exemplary components of a data warehouse comprising a mapping data structure; and FIGS. 10A–D and 11A–D are relational views of exemplary updated components of a data warehouse comprising updated mapping data structures;

DETAILED DESCRIPTION OF THE PREFERRED EMBODIMENTS

Figure 1:
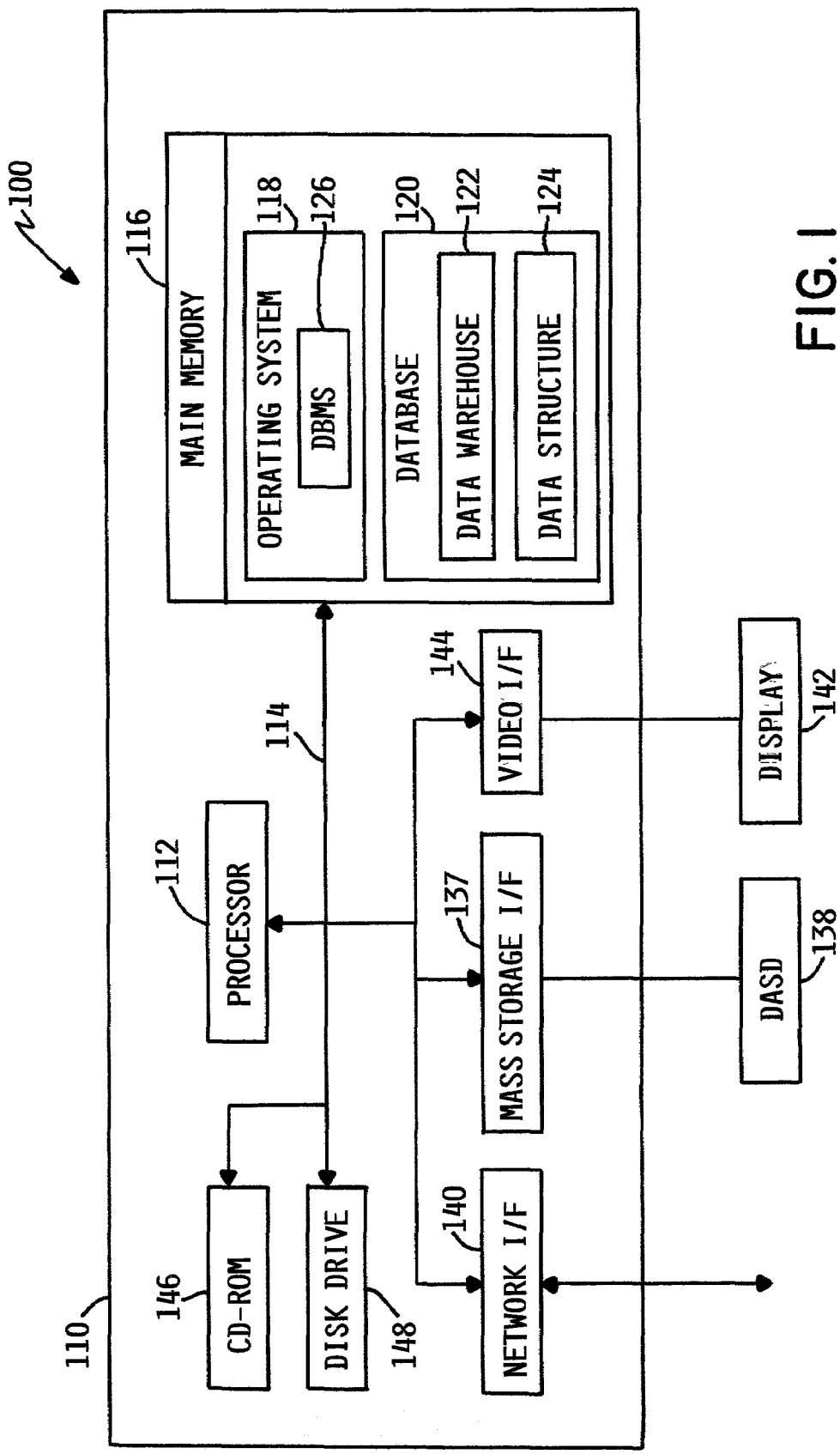
FIGS. 1–3 are high level diagrams of a computing environment according to an aspect of the present invention.

The present invention generally provides a method, a data structure, a computer program product and a computer for correlating different data sources and, more particularly, for correlating data from at least two different data sources in a data warehouse.

In the following description, the term "replicating" is used to designate a real-time copying process of a portion of data, which has been changed, wherein the portion of data is automatically copied when the change occurs. The term "extracting" is used to designate an automated periodical copying process of the entire data at pre-determined time intervals. However, it should be appreciated that both, the described "replicating" and "extracting" processes are interchangeable in the described embodiments and that any modifications to the described "replicating" and "extracting" processes are also contemplated. For instance, "replicating" may comprise copying the entire data when the change occurs and "extracting" may be performed at any desired time and/or may be initiated manually by a user. Furthermore, it should be noted that the terms "identifier" and "key" are interchangeably used in the following description and additionally, where reference is made to a table, the terms "data record" and "row" are used interchangeably.

One embodiment of the invention is implemented as a program product for use with a computer system such as, for example, the computing environment 100 shown in FIGS. 1–3 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Referring now to FIG. 1, a computing environment 100 comprising an illustrative computer system 110 according to one aspect of the present invention is shown. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, data structure, computer program product and computer-readable mediums of the invention. Illustratively, the computer system 110 is part of a networked system; however, in other embodiments, the computer system 110 is a standalone device. Accordingly, the invention may be practiced in a distributed computing environment in which tasks are performed by remote processing devices that are linked through a communications network. In a distributed computing environment, program modules may be located in both local and remote memory storage devices.

In any case, it is understood that FIG. 1 is merely one configuration for a computing environment and computer system. Embodiments of the invention can apply to any comparable configuration, regardless of whether the computer system 110 is a complicated multi-user apparatus, a single-user workstation, or a network appliance that does not have non-volatile storage of its own.

The computer system 110 could include a number of operators and peripheral systems as shown, for example, by a mass storage interface 137 operably connected to a direct access storage device 138, and by a video interface 144 operably connected to a display 142. The display 142 may be any video output device for outputting viewable information. The computer system 110 could further include a number of storage media drives such as a CD-ROM drive 146 and a diskette drive 148 suitable to read out information permanently stored on non-writable storage media (e.g., read-only memory devices within a computer such as CD-ROM disks readable by CD-ROM drive 146) or alterable information stored on writable storage media (e.g., floppy disks readable by diskette drive 148). CD-ROM drive 146 and diskette drive 148 are illustrated as forming an integral part of computer system 110. It should, however, be appreciated that either CD-ROM drive 146 or diskette drive 148, or both of them, may be provided as peripheral devices that are operably connected to the computer system 110.

Computer system 110 may further comprise any type of suitable input means (not shown) to give input to the computer system 100. For example, a keyboard, keypad, light pen, touch screen, button, mouse, track ball, or speech recognition unit could be used. Further, this input means and display 142 could be combined. For example, a display screen with an integrated touch screen, a display with an integrated keyboard or a speech recognition unit combined with a text speech converter could be used.

Computer system 110 is shown comprising at least one processor 112, which obtains instructions, or operation codes, (also known as opcodes), and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in computing environment 100, for example, any storage capacity used as virtual memory or stored on a mass storage device (e.g., direct access storage device 138) or on another computer coupled to the computer system 110.

As shown, the main memory 116 includes an operating system 118. The operating system 118 may be any suitable operating system capable of supporting the functions of the present invention. An exemplary operating system, which may be used to advantage, is Linux. The operating system 118 may include a database management system (DBMS) 126, which may be implemented as a relational database management system (RDBMS). The DBMS may be a separate application stored in main memory 116 or any other storage.

The DBMS is used for managing a database 120 and, in particular, for storing and retrieving data in a data warehouse 122 of the database 120. The database 120 may be included in main memory 116 for storing any type of information and, in particular, data warehouse 122 and a data structure 124. The data warehouse 122 comprises data of at least two different data sources. The data structure 124 is suitable to correlate the data of the at least two different data sources in data warehouse 122.

Computer system 110 further comprises a network interface 140 operably connected to data bus 114. Network interface 140 is suitable to establish a network connection between computer system 110 and another computer system via a communications network 160 (as shown in FIG. 2 and 3), preferably via the Internet.

Figure 2:
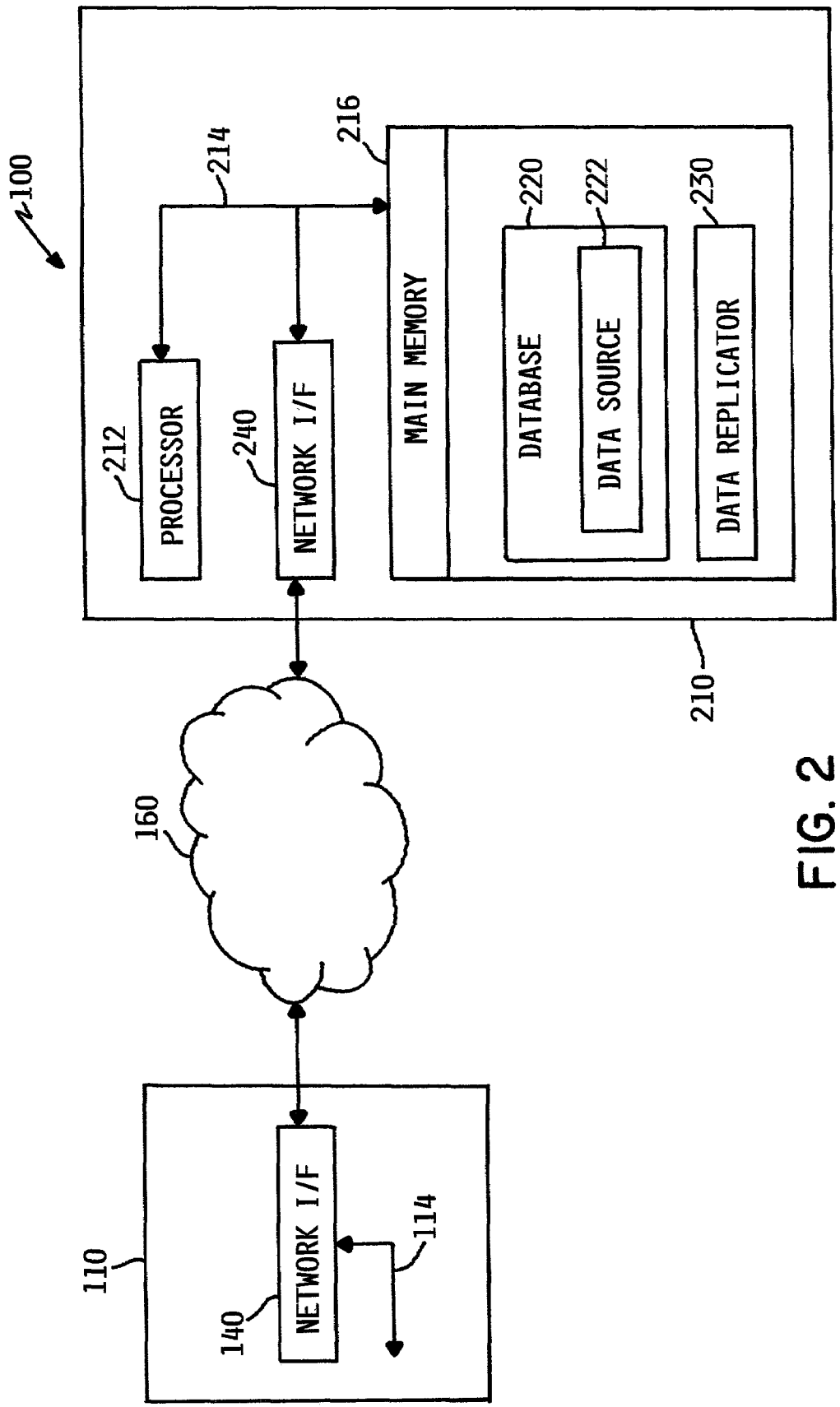

FIG. 2 shows computing environment 100 comprising computer system 110 of FIG. 1 and one further illustrative computer system 210. Computer system 110 and computer system 210 are both connected to communications network 160. Illustratively, computer system 110 comprises network interface 140 operably connected to bus 114. For the purpose of simplicity, other features of computer system 110, which have been described above with respect to FIG. 1, have been omitted in FIG. 2. Further, while only one computer system 210 is shown connected to communications network 160, it should be clear that more than one computer system 210 may be connected to communications network 160.

Computer system 210 preferably comprises a processor 212 operably connected to a network interface 240 and a main memory 216 via data bus 214. The network interface 240 is suitable to establish the communication with computer system 110 via communications network 160.

The main memory 216 is any memory sufficiently large to hold the necessary programs and data structures. Main memory 216 could be one or a combination of memory devices, including Random Access Memory, nonvolatile or backup memory, (e.g., programmable or Flash memories, read-only memories, etc.). In addition, memory 216 may be considered to include memory physically located elsewhere in computing environment 100, for example, any storage capacity used as virtual memory or stored on a mass storage device (not shown) or on another computer coupled to the computer system 210.

As shown, the main memory 216 preferably includes a database 220 for storing any type of information and, in particular, a data source 222 representing data to be loaded into the data warehouse 122 of FIG. 1. The main memory 216 may also include a data replication system 230, also referred to as data replicator, suitable to replicate data of data source 222 to the data warehouse 122. Illustratively, the data replicator is a Data Propagator available from International Business Machines Corporation of Armonk, N.Y.

Data replication system 230 may be implemented as a software program, which may be launched to replicate the data of data source 222 to data warehouse 122. The data replication system 230 may comprise a detection unit (not shown) to detect changes in the data of data source 222 and a replication unit (not shown) to replicate the data of data source 222 to data warehouse 122 when a change occurs.

In FIG. 2, data replication system 230 illustratively resides in main memory 216. However, it should be appreciated that data replication system 230 may be provided independently of main memory 216, e.g., in a specifically designed hardware component of computer system 210 or on a remote computer system that is connected with computer system 210, for example, via communications network 160. Accordingly, data replication system 230 may also reside on computer system 110 of FIG.1.

Figure 3:
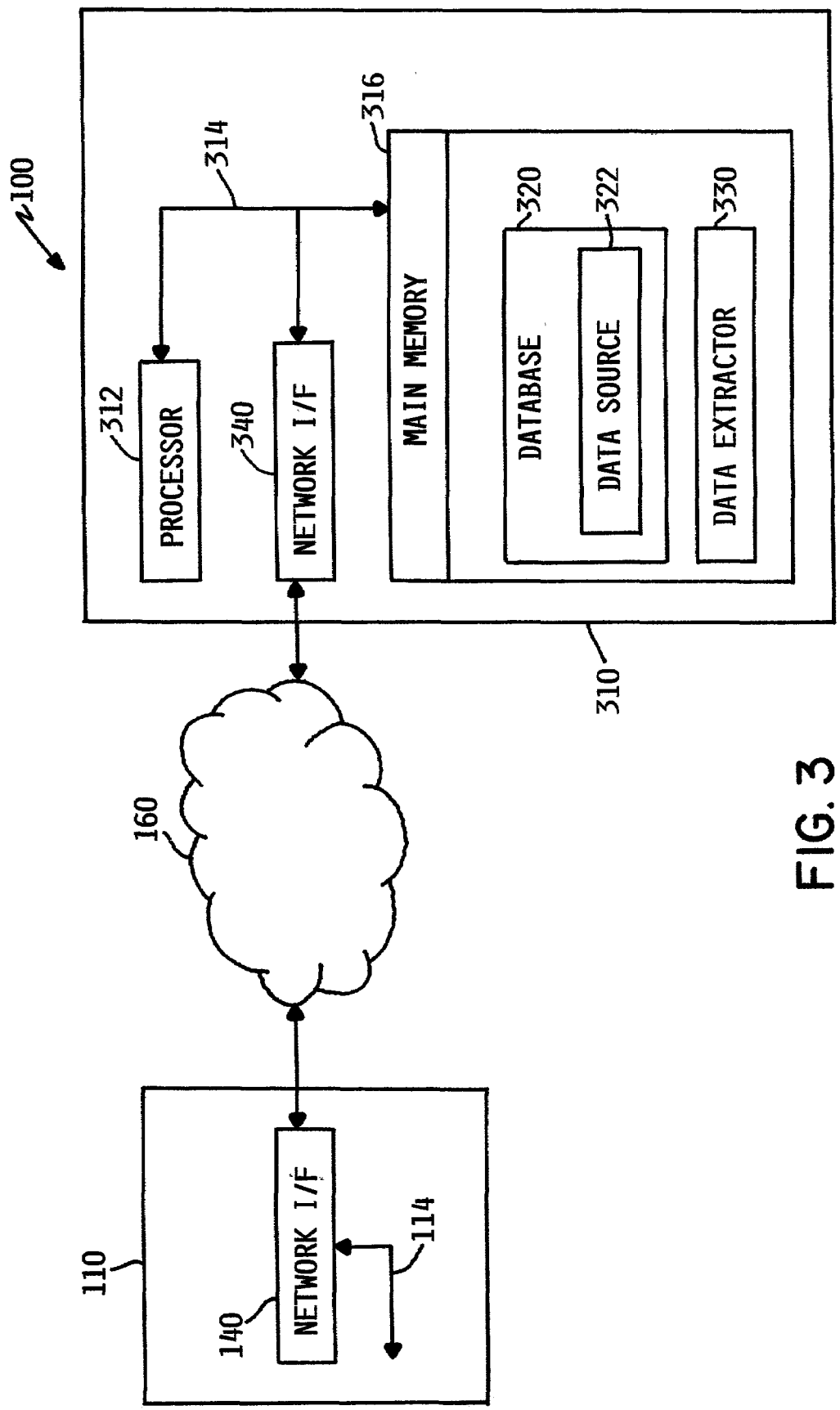

FIG. 3 shows computing environment 100 comprising computer system 110 of FIG. 1 and one further illustrative computer system 310. Computer system 110 and computer system 310 are both connected to communications network 160. Illustratively, computer system 110 comprises network interface 140 operably connected to bus 114. For the purpose of simplicity, other features of computer system 110, which have been described above with respect to FIG. 1, have been omitted in FIG. 3. Further, while only one computer system 310 is shown connected to communications network 160, it should be clear that more than one computer system 310 may be connected to communications network 160. In one embodiment, at least one computer system 110 of FIG. 1, at least one computer system 210 of FIG. 2 and a plurality of computer systems 310 are connected to communications network.

Computer system 310 preferably comprises a processor 312 operably connected to a network interface 340 and a main memory 316 via data bus 314. The network interface 340 is suitable to establish the communication with computer system 110 via communications network 160.

The main memory 316 is any memory sufficiently large to hold the necessary programs and data structures. Main memory 316 could be one or a combination of memory devices, including Random Access Memory, nonvolatile or backup memory, (e.g., programmable or Flash memories, read-only memories, etc.). In addition, memory 316 may be considered to include memory physically located elsewhere in computing environment 100, for example, any storage capacity used as virtual memory or stored on a mass storage device (not shown) or on another computer coupled to the computer system 310.

As shown, the main memory 316 preferably includes a database 320 for storing any type of information and, in particular, a data source 322 representing data to be loaded into the data warehouse 122 of FIG. 1. The main memory 216 may also include a data extraction system 330, also referred to as data extractor, suitable to extract data of data source 322 to the data warehouse 122. Illustratively, the data extractor is a DB2 Warehouse Manager available from International Business Machines Corporation of Armonk, N.Y.

Data extraction system 330 may be implemented as a software program, which may be launched to extract the data of data source 322 to data warehouse 122. The data extraction system 330 may comprise a timer (not shown) adapted to count time units and an extraction unit (not shown) to extract the data of data source 322 to data warehouse 122 dependent on the time units counted by the timer.

In FIG. 3, data extraction system 330 is illustratively resides in main memory 316. However, it should be appreciated that data extraction system 330 may be provided independently of main memory 316, e.g., in a specifically designed hardware component of computer system 310 or on a remote computer system that is connected with computer system 310, for example, via communications network 160. Accordingly, data extraction system 330 may also reside on computer system 110 of FIG.1. Furthermore, it should be noted that any one of computer systems 110 of FIG. 1, 210 of FIG. 2 and 310 of FIG. 3 may comprises arbitrary combinations of the above described features. For instance, main memory 116 of computer system 110 of FIG. 1 may comprise data source 222 and data replication system 230 of FIG. 2 and/or data source 322 and data extraction system 330 of FIG. 3 in addition to the features described above with reference to FIG. 1.

Figure 4:
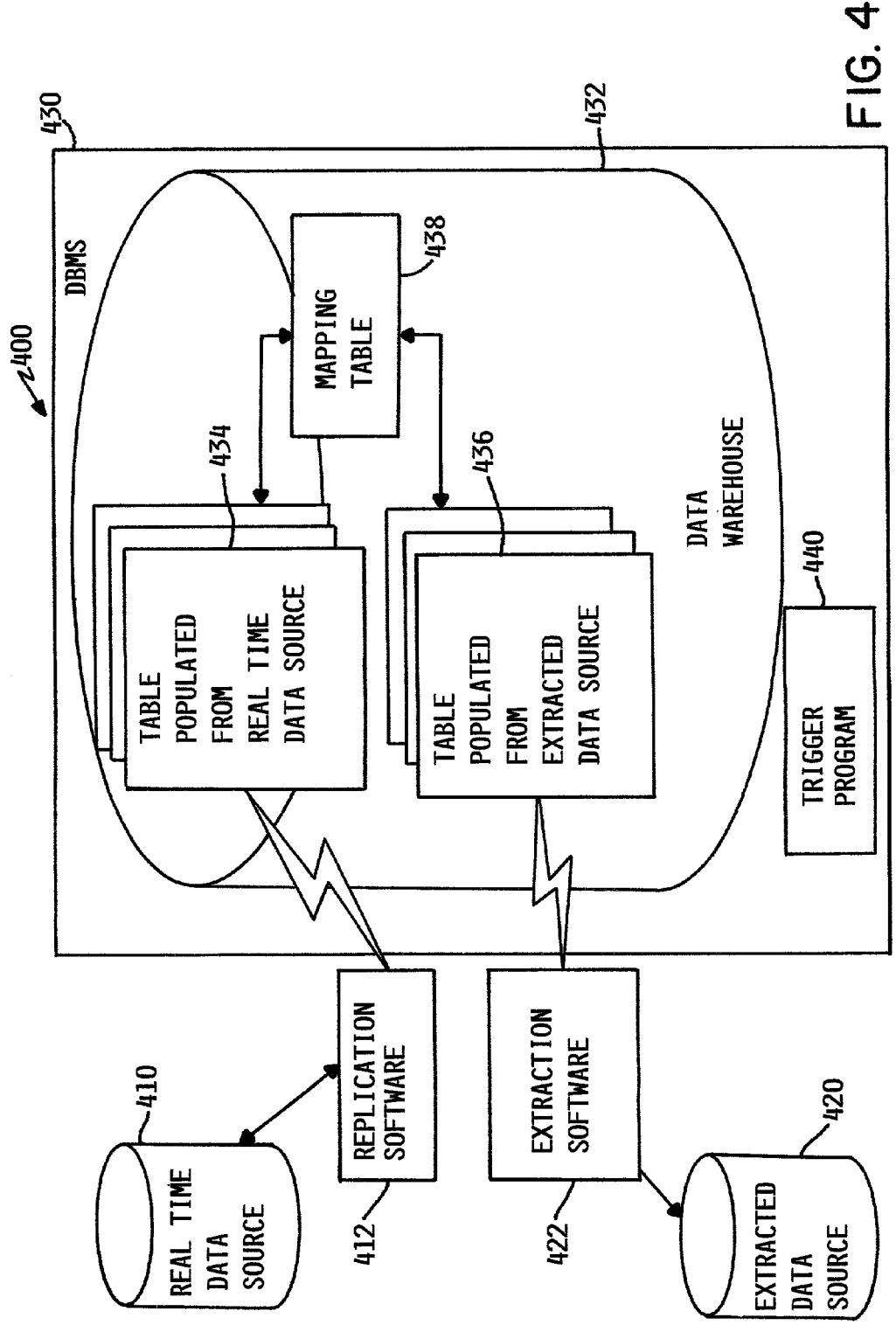
FIG. 4 is a relational view of a data management system (DMS) according to one embodiment of the invention.

FIG. 4 shows a relational view of a data management system (DMS) 400 according to one embodiment of the invention. The DMS 400 comprises a first data source 410 (e.g., data source 222 of FIG. 2), a second data source 420 (e.g., data source 322 of FIG. 3) and a database management system (DBMS) 430 (e.g., DBMS 126 of FIG. 1), which may be implemented on one or more computer systems (e.g., computer systems 110 of FIG.1, 210 of FIG. 2 and 310 of FIG. 3).

Illustratively, the DBMS 430 comprises a data warehouse 432 (e.g., data warehouse 122 of FIG. 1) and an updating system 440. The data warehouse 432 comprises a first plurality of tables 434 comprising data loaded from the first data source 410. The first data source 410 represents a real-time data source, i.e., data from the first data source 410 is replicated to the first plurality of tables 434. The data warehouse 432 further comprises a second plurality of tables 436 comprising data loaded from the second data source 410. The second data source 420 represents an extracted data source, i.e., data from the second data source 420 is extracted to the second plurality of tables 436. The data warehouse 432 illustratively comprises a mapping table 438 for correlating the data comprised in the first plurality of tables 434 and the second plurality of tables 436. In one embodiment, the updating system 440 may be implemented as a trigger program. The trigger program may be activated when data is loaded from the first data source 410 and/or the second data source 420. The trigger program is adapted to detect changes in the loaded data and to update the mapping table 438 on the basis of the detected changes.

The DMS 400 further comprises a data replicator 412 (e.g., data replicator 230 of FIG. 2) and a data extractor 422 (e.g., data extractor 330 of FIG. 3), which may be implemented separately on different computer systems (e.g., computer systems 110 of FIG.1, 210 of FIG. 2 and 310 of FIG. 3) or, alternatively, together on one computer system (e.g., any one of computer systems 110 of FIG.1, 210 of FIG. 2 and 310 of FIG. 3). The data replicator 412 is implemented as replication software adapted to monitor the first data source 410 and to replicate data from the first data source 410 to the first plurality of tables 434 when a change occurs. The data extractor 422 is implemented as extraction software adapted to extract data from the second data source 420 to the second plurality of tables 436 periodically.

The DMS 400 initially performs a loading process to create mapping table 438, which is preferably primed with internal keys of data records of the first data source 410 and comprises a plurality of mapping data records. The mapping table 438 includes at least one warehouse internal identifier representing a primary key, and at least one external identifier it maps to. The data from the first data source 410 is loaded first to the first plurality of tables 434 of data warehouse 432, whereby the first plurality of tables 434 is populated. For each data record in the first data source 410, the warehouse internal identifier is the same as a corresponding internal key of a data record of the first data source 410.

After loading the data from the first data source 410, data from at least one second data source 420 is loaded to the second plurality of tables 436 of data warehouse 432, whereby the second plurality of tables 436 is populated. Each data record of the second data source 420 may comprise an internal key and at least one external key it maps to. If an external key of a data record from the second data source 420 matches an external identifier of the first data source 410 or an external identifier in a data record of a table representing a historical external identifier mapping table, the corresponding data record in the mapping table 438 is updated to include the extracted data sources internal key.

Otherwise, a new mapping data record is inserted into the mapping table 438 with a value of warehouse internal identifier being a generated value in a range different from a range of possible values of the internal keys of the data records of the first data source 410. For instance, if the values of the first data sources internal keys represent 32-bit integers, the warehouse internal keys may represent 64-bit integers. Accordingly, by adding 5 billion to the second data sources internal key, it may be guaranteed that the generated values of warehouse internal keys would not overlap the values of internal keys of data records of the first data source 410. If data of a third data source is loaded to the data warehouse 432, an additional range of possible values may be included, so that the internal keys of a third data source may, for example, start at 10 billion.

According to the data records of the mapping table 438, the data records of the second plurality of tables 436 in the data warehouse 432 are updated to use the internal keys of the mapping table 438. This completes the initial loading process of the DMS 400. Ongoing updates to the data warehouse 432 require handling changes to the mapping table 438 and to tables from the second data source 420.

When, for instance, the initial mapping of the internal identifiers of the first data source 410 to associated external identifiers changes, the mapping table 438 must also be updated. In this case, the updating system 440 may replace the mapping table 438 with an internal-to-external identifier mapping table of the first data source 410, e.g., via a copying process. Thus, when data records are inserted, updated, or deleted in the internal-to-external identifier mapping table of the first data source 410, the corresponding changes are made to the mapping table 438. As these changes are simple changes to the mapping table 438, they occur quickly and do not significantly impact the replication process.

Changes to the second data source 420 are processed in a manner similar to the processing during the initial load. If the external key of an updated data record from the second data source 420 matches an external identifier in the mapping table 438 or in the historical external identifier mapping table, the corresponding data record in the mapping table 438 is updated as described above. Otherwise, a new data record is inserted as described above. If any updates are made to the mapping table 438, the corresponding data records of the second plurality of tables 436 in the data warehouse 432 are accordingly updated.

Figure 5A:
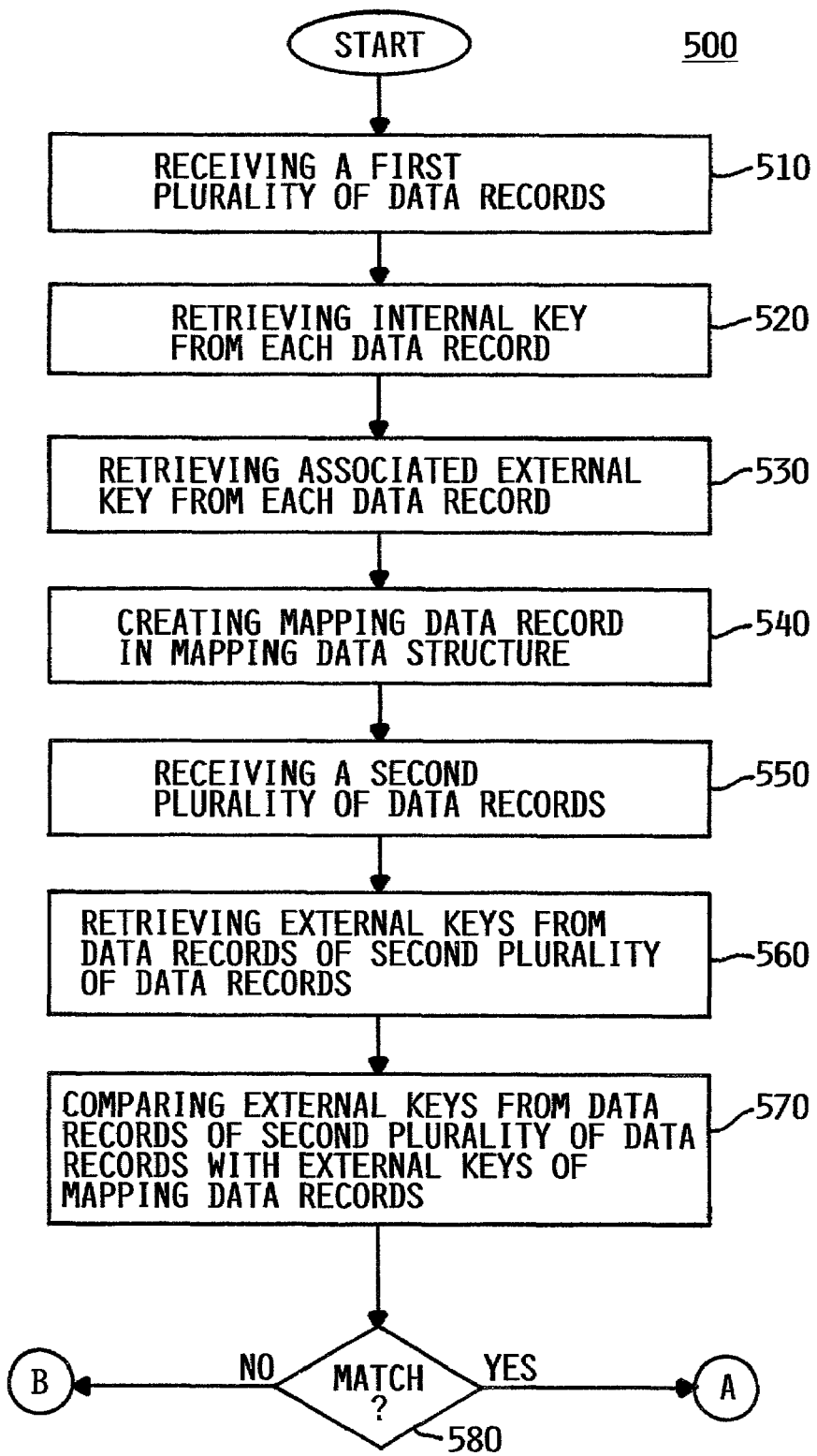
FIGS. 5A–C are flow charts illustrating creation of a mapping data structure according to one embodiment of the invention.
Figure 5B:
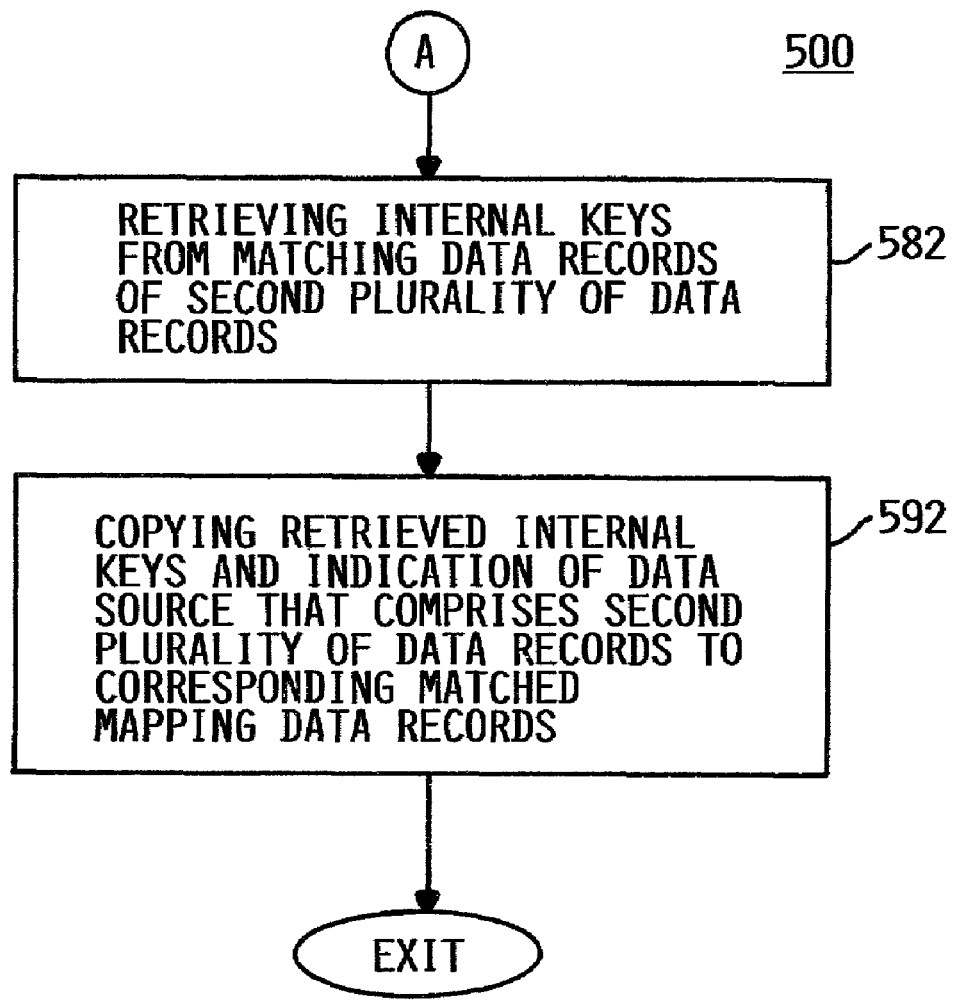
Figure 5C:
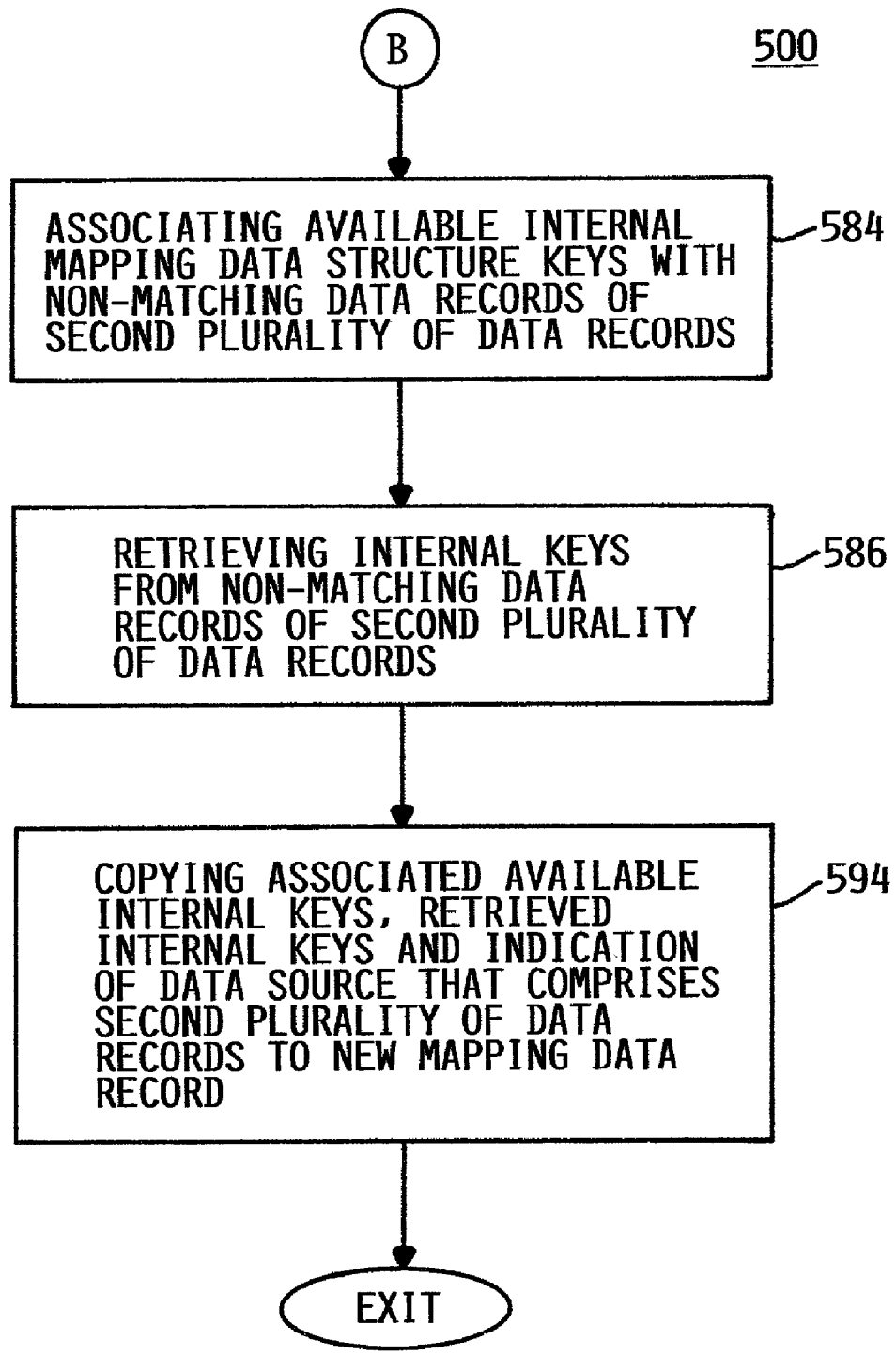

FIGS. 5A–C show a method 500 of correlating at least a first plurality of data records and a second plurality of data records. Each data record of the first plurality of data records is uniquely identified within a corresponding data source by an associated internal identifier and each data record of the first and second plurality of data records comprises at least one external identifier. In general, according to FIG. 5A, a data record of the first plurality of data records and at least one data record of the second plurality of data records having an identical external identifier are determined. According to FIGS. 5B and 5C, the at least one determined data record of the second plurality of data records is mapped to the internal identifier associated with the determined data record of the first plurality of data records.

Referring now to FIG. 5A, in step 510 the first plurality of data records is received, for example, in data warehouse 122 of FIG. 1 or 432 of FIG. 4. The first plurality of data records may be loaded from a first data source (e.g., data source 222 of FIG. 2 or 410 of FIG. 4). Loading the data from the first data source comprises loading the data from a real-time data source, wherein loading data from the real-time data source comprises replicating the data. Replicating the data comprises monitoring the data in the real-time data source, and, if a portion of the data has changed, launching a replication program suitable for copying the portion of the data. In step 520, for each data record of the first plurality of data records, an associated internal identifier is retrieved from the data record. In step 530, at least one external identifier is retrieved from each data record. In step 540, for each data record, a mapping data record is created in a mapping data structure (e.g., mapping table 438 of FIG. 4), the mapping data record comprising the retrieved associated internal identifier and the at least one retrieved external identifier of a corresponding data record of the first plurality of data records.

In step 550 the second plurality of data records is received, for example, in data warehouse 122 of FIG. 1 or 432 of FIG. 4. The second plurality of data records may be loaded from a second data source (e.g., data source 322 of FIG. 3 or 420 of FIG. 4). Loading the data from the second data source comprises loading the data from an extracted data source, wherein loading data from the extracted data source comprises extracting the data. Extracting the data comprises launching an extraction program suitable for copying the data. In step 560, for each data record of the second plurality of data records, at least one external identifier is retrieved from the data record. In step 570, the at least one retrieved external identifier is compared with the at least one external identifier of each mapping data record in the mapping data structure. In step 580, a determination is made whether the at least one retrieved external identifier matches the at least one external identifier of a mapping data record in the mapping data structure. Accordingly, the determination is made for each data record in the second data record.

Referring now to FIG. 5B, if the retrieved external identifier of the second data source matches an external identifier of a specific mapping data record in the mapping data structure, an internal identifier associated with the data record of the second plurality of data records is retrieved from the data record in step 582. The retrieved internal identifier uniquely identifies the data record of the second plurality of data records within a corresponding data source. In step 592, the retrieved internal identifier and an indication of the corresponding data source is copied to the matching mapping data record in the mapping data structure.

Referring now to FIG. 5C, if the retrieved external identifier of the second data source does not match an external identifier of any mapping data record in the mapping data structure, an available internal identifier (generated from a range beyond that of the first data source such as adding 5 billion to the internal identifier of the second data source) is associated with the non-matching data record of the second plurality of data records in step 584. The available internal identifier uniquely identifies the non-matching data record within the mapping data structure. In step 586, an internal identifier associated with the non-matching data record of the second plurality of data records is retrieved from the data record. The retrieved internal identifier uniquely identifies the data record of the second plurality of data records within a corresponding data source. In step 594, the associated available internal identifier, the retrieved external identifier and an indication of the corresponding data source is copied to mapping data structure. Accordingly, a new mapping data record is created in the mapping data structure. The new mapping data record comprises the associated available internal identifier, the retrieved external identifier and the indication of the corresponding data source.

For purposes of illustration, FIGS. 6A–11D show a detailed example of correlating data of two different data sources according to an aspect of the invention.

Figure 6A:
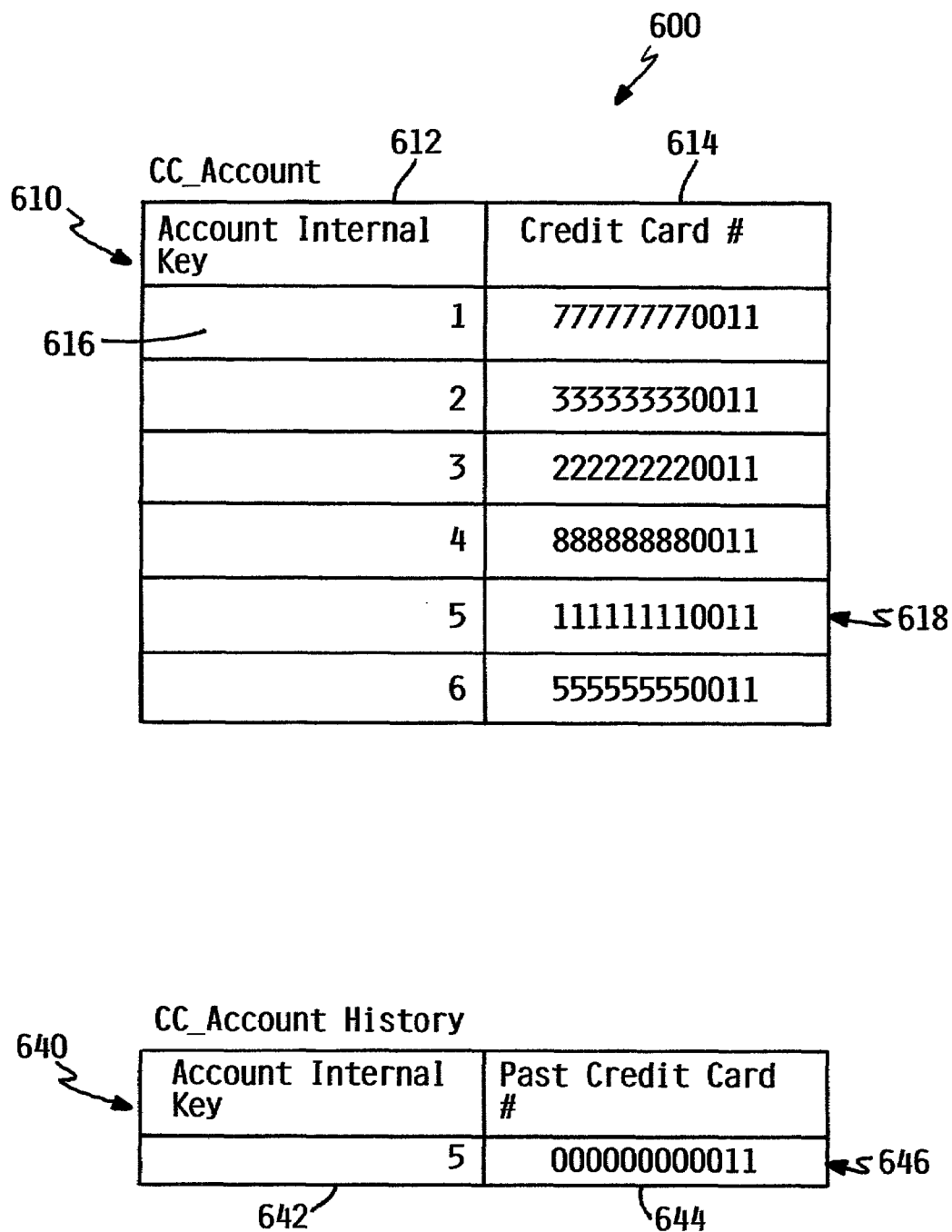

FIGS. 6A–C, in the following collectively referred to as FIG. 6, show relational views of exemplary components of a first data source 600 (e.g., data source 222 of FIG. 2 or 410 of FIG. 4). The first data source 600 illustratively represents data relating to a credit card system. The data will be replicated in real-time to a data warehouse, for example, to data warehouse 122 of FIG. 1 or 432 of FIG. 4.

The first data source comprises tables 610, 620, 630 and 640, which are labeled "CC_Account", "CC_Transaction", "CC_Customer" and "CC_Account History", respectively. Table 610 comprises a first column 612 labeled "Account Internal Key", which comprises internal keys uniquely identifying data records representing accounts within the credit card system, and a second column 614 labeled "Credit Card #", which comprises external keys. Table 610 maps the internal keys of column 612 to the external keys of column 614. Table 620 is a table of transactions and comprises columns 622 labeled "Transaction Number", 624 labeled "Account Internal Key", 626 labeled "Date" and 628 labeled "Price". Column 624 comprises keys that match internal keys in column 612 of table 610. Table 620 illustrates transactions, each transaction representing a data record, i.e. a row in table 620, which have been performed, for example, by customers using corresponding credit cards. The transactions are mapped to the external keys in column 614 of table 610 via the keys in column 624. Table 630 is a table of customers and comprises columns 612, 632 labeled "Name", 634 labeled "Address", 636 labeled "City" and 638 labeled "State". Table 630 maps the credit card numbers, i.e., the external keys of column 614 of table 610 via the keys in column 612 to specific customers and provides personal information on each customer. Table 640 comprises columns 642 labeled "Account Internal Key" and 644 labeled "Past Credit Card #". Column 642 comprises keys that match internal keys in column 612 of table 610. Table 640 illustrates past credit card numbers an account was associated with and maps the past credit card numbers with the credit card numbers of column 614 of table 610 using the internal keys. For instance, data record 618 of table 610 indicates that internal key "5" is associated with current credit card number "111111110011" and row 646 of table 640 indicates that the internal key "5" was previously associated with past credit card number "000000000011".

By using an internal key of column 612 of table 610, data records in tables 610, 620,630 and 640 may be joined. Joined data records can provide information relating to the credit card system. For instance, frequency of use of credit cards may be determined or transactions performed with a credit card may easily been mapped to a specific customer. Accordingly, by joining tables 610, 620 and 630 using internal key 616 of table 610, i.e., "1", it can be determined that "John Smith" used credit card number "777777770011" to make a purchase of "$10.00" on "Apr. 5, 2002" and to make another purchase of "$701.12" on "Apr. 6, 2002".

Figure 7C:
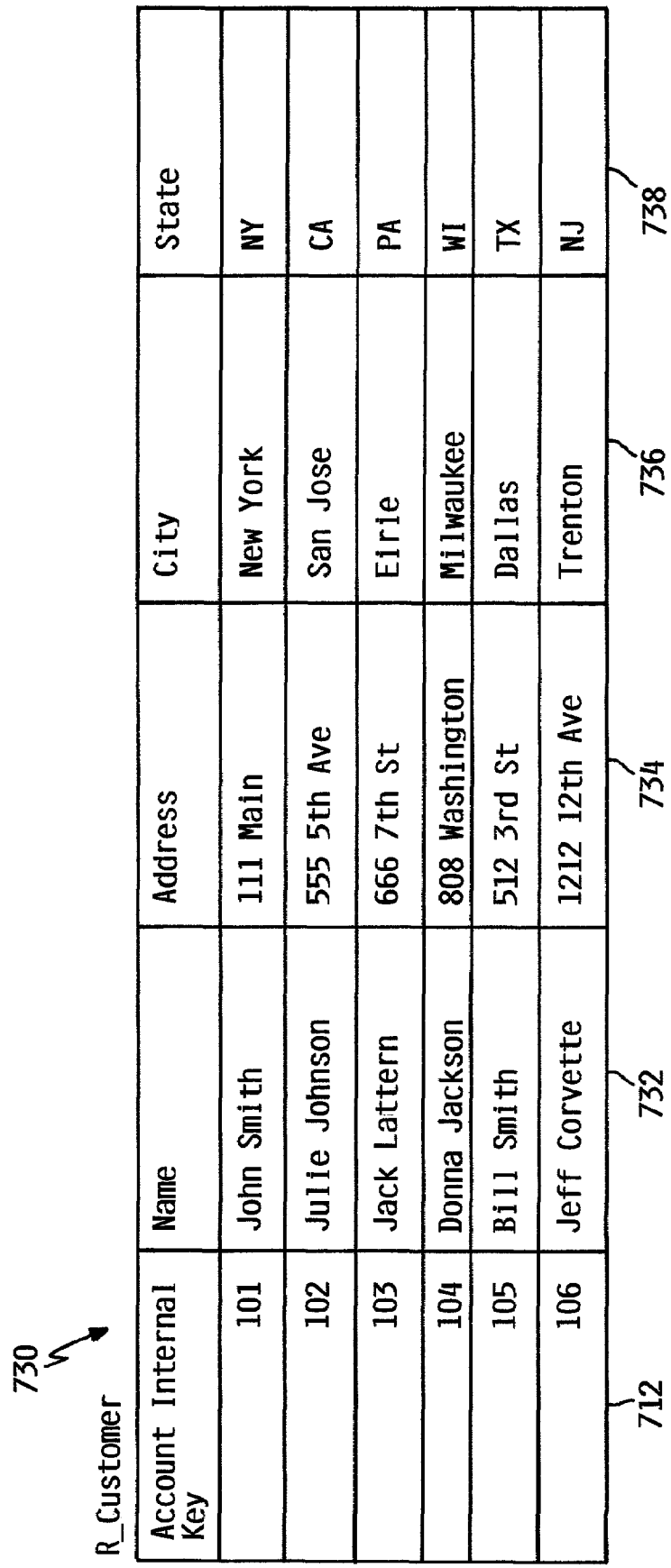

FIGS. 7A–C, in the following collectively referred to as FIG. 7, show relational views of exemplary components of a second data source 700 (e.g., data source 322 of FIG. 3 or 420 of FIG. 4). The second data source 700 illustratively represents data relating to a reward system. The data will be extracted, e.g., as a daily extract to a data warehouse, for example, to data warehouse 122 of FIG. 1 or 432 of FIG. 4.

The second data source comprises, in analogy to tables 610, 620 and 630 of FIG. 6, tables 710, 720 and 730, which are labeled "R_Account", "R_Transaction" and "R_Customer", respectively. Table 710 comprises a first column 712 labeled "Account Internal Key", which comprises internal keys uniquely identifying data records representing accounts within the reward system, and a second column 714 labeled "Reward Card #", which comprises external keys. The external keys of column 714 represent reward card numbers, which are identical to external keys of column 614 of FIG. 6, which represent credit card numbers. Table 710 maps the internal keys of column 712 to the external keys of column 714. Table 720 is a table of transactions and comprises columns 722 labeled "Transaction Number", 724 labeled "Account Internal Key", 726 labeled "Date" and 728 labeled "Points". Column 724 comprises keys that match internal keys in column 712 of table 710. Table 720 illustrates transactions, each transaction representing a data record, i.e. a row in table 720, which have been performed, for example, by customers using corresponding reward cards and for which a certain amount of points has been rewarded according to column 728. The transactions are mapped to the external keys in column 714 of table 710 via the keys in column 724. Table 730 is a table of customers and comprises columns 712, 732 labeled "Name", 734 labeled "Address", 736 labeled "City" and 738 labeled "State". Table 730 maps the reward card Nos., i.e., the external keys of column 714 of table 710 via the keys in column 712 to specific customers and provides personal information on each customer.

By using an internal key of column 712 of table 710, data records in tables 710, 720 and 730 may be joined. Joined data records can provide information relating to the reward system. For instance, frequency of use of reward cards may be determined or transactions performed with a reward card may easily been mapped to a specific customer. Accordingly, by joining tables 710, 720 and 730 using internal key 716 of table 710, i.e., "101", it can be determined that "John Smith" used reward card number "777777770011" on "Apr. 5, 2002" and earned "10" points and on "Apr. 6, 2002" and earned "500" points.

FIGS. 8A–11D illustrate a method of correlating the data of the first data source 600 of FIG. 6 and the data of the second data source 700 of FIG. 7 in a data warehouse (e.g., data warehouse 122 of FIG. 1 or 432 of FIG. 4). This may, for example, be useful to determine the number of reward points a customer earned by using a corresponding credit card.

Figure 8A:
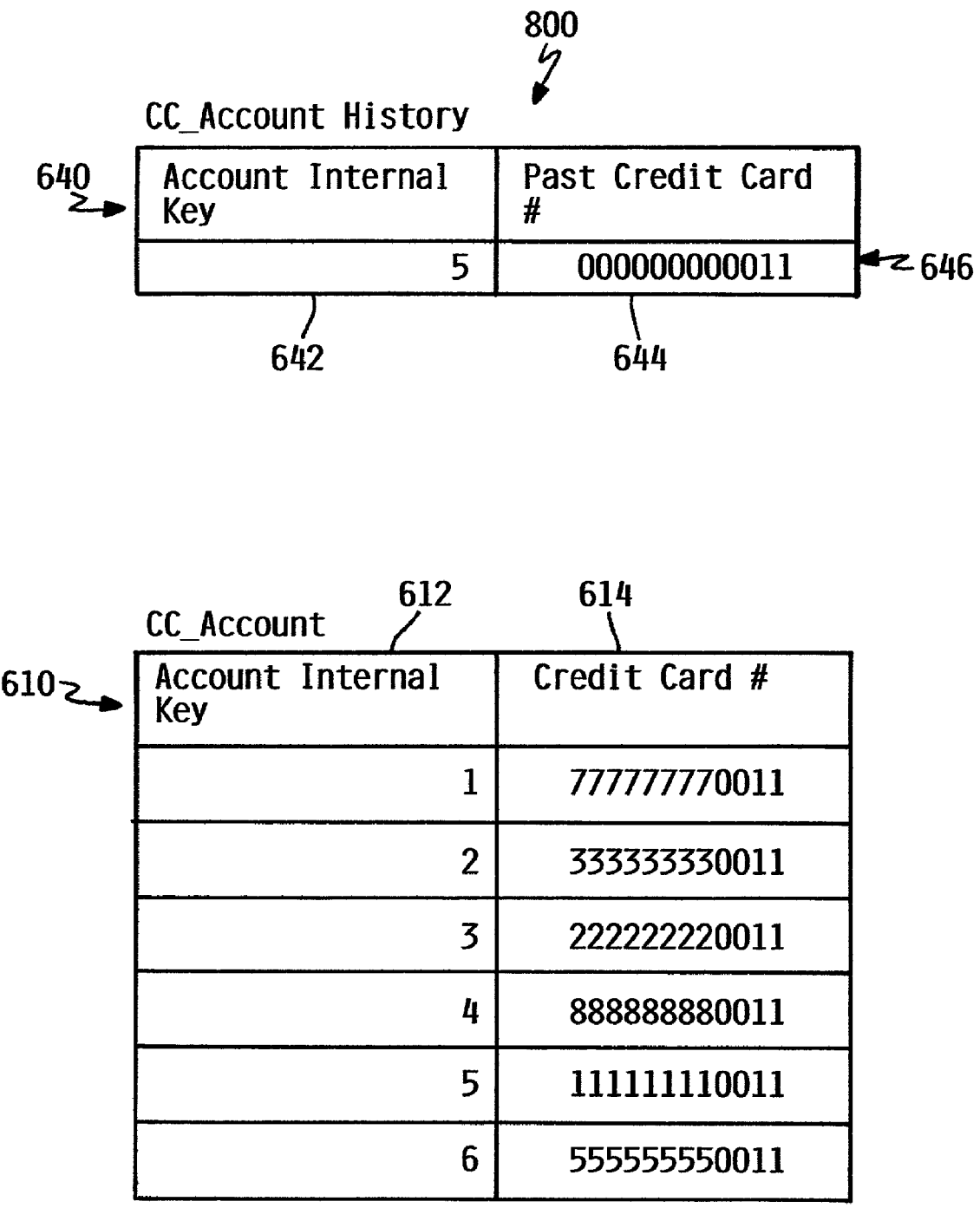

FIGS. 8A–B, in the following collectively referred to as FIG. 8, show an exemplary relational view of a database 800. Database 800 illustratively represents a portion of a data warehouse, e.g., data warehouse 122 of FIG. 1 or 432 of FIG. 4, used to initially create a mapping data structure 810 (e.g., data structure 124 of FIG. 1 or mapping table 438 of FIG. 4). Database 800 comprises tables 610 and 640 of the first data source 600 of FIG. 6, table 710 of the second data source 700 of FIG. 7 and the mapping data structure 810 labeled "WH_Mapping". Tables 610, 640 and 710 have been loaded from the corresponding data sources to database 800.

Mapping data structure 810 illustratively represents a table that comprises a first column 812 labeled "WHKEY", which comprises internal keys uniquely identifying data records representing accounts within database 800, a second column 814 labeled "EXTID" which comprises external keys associated with data records of the first and second data sources, and a third column 816 labeled "XTRCT1KEY" comprising internal keys uniquely identifying data records within the second data source 700. The external keys of column 814 represent external keys, which are common to data records of the first and second data sources. Accordingly, mapping data structure 810 correlates the data records of the first and second data sources by mapping associated internal identifiers to common external identifiers of the data records.

Mapping data structure 810 is generated by creating a mapping data record for each of the data records of table 610, for example, by copying the data records of table 610 into mapping data structure 810. Thus, for each data record of table 610, a corresponding mapping data record is created in mapping data structure 810, whereby the internal keys of column 612 of table 610 are copied to column 812 and the external keys of column 614 of table 610 are copied to column 814. Furthermore, for each row in table 710, a mapping data record in mapping data structure 810 is determined, which comprises an external identifier in column 814 that matches the external identifier of column 714 of table 710. The internal identifier of column 712 of table 710 associated with a matching external identifier is copied to column 816 of the determined mapping data record.

For each data record associated with an external identifier in column 814 of mapping data structure 810, where no data record with a matching external identifier in column 714 of table 710 could be determined, no value is created in column 816, which results in the value being a "null" value. This indicates that there is no match as, e.g., in data record 822. For each data record associated with an external identifier in column 714 of table 710, where no data record with a matching external identifier in column 814 of mapping data structure 810 could be determined, table 640 is accessed, as, e.g., for row 830 of table 710. If column 644 of table 640 comprises an external identifier that matches an external identifier in column 714 of a data record in table 710, which does not match an external identifier in column 814 of mapping data structure 810, the associated internal identifier is retrieved from column 642 of table 640. As shown in FIG. 8, data record 830 of table 710 and row 646 of table 640 comprise an identical external key. As described above with respect to FIG. 6, the associated internal identifier matches an internal key in column 612 of table 610 and, thus, matches an internal key in column 812 of mapping data structure 810. Accordingly, the associated internal identifier may be copied to the corresponding data record in mapping data structure 810 into column 816. If column 644 of table 640 does not contain a matching external identifier, a new value is created in column 812, for example, as described above with respect to FIG. 4 (e.g., value "5G+106" in data record 824).

FIGS. 9A–D, in the following collectively referred to as FIG. 9, show an exemplary relational view of a database 900. Database 900 illustratively represents a data warehouse, e.g. data warehouse 122 of FIG. 1 or 432 of FIG. 4, wherein the tables of the second data source 700 have been updated so that queries may be issued against the data warehouse 900. Database 900 comprises tables 610, 620, 630 and 640 of the first data source 600 of FIG. 6, mapping data structure 810 of FIG. 8 and tables 920 and 930.

Tables 920 and 930 represent tables 720 and 730 of FIG. 7, respectively, which have been updated on the basis of mapping data structure 810. Table 710 of FIGS. 7 and 8 labeled "R_Account" is not shown in FIG. 9, but is unchanged and not used in queries of the database 900. Tables 720 and 730 of FIG. 7 are updated to use the internal identifiers of column 812 labeled "WHKEY" of mapping data structure 810 by retrieving the internal identifiers in columns 724 and 712 of tables 720 and 730, respectively, and replacing the internal identifiers with the corresponding internal keys of column 812 of mapping data structure 810. To construct queries against the database 900, the mapping data structure 810 is used to join the tables 620, 630, 920 and 930 by mapping the internal keys of column 812 to the internal identifiers in columns 624, 612, 724 and 712 of the tables 620, 630, 920 and 930, respectively.

FIGS. 10A–D, in the following collectively referred to as FIG. 10, show an exemplary relational view of a database 1000. Database 1000 illustratively represents database 900, which has been updated. Illustratively, database 1000 comprises tables 920 and 930 of FIG. 9, mapping data structure 1050 and tables 1010,1020,1030 and 1040.

Tables 1010, 1020, 1030 and 1040 represent tables 610, 620, 630 and 640 of FIG. 6, respectively, which have been updated. For brevity, only the updates will be described (as other aspects of database 1000 have been described above). Data record 1012 of table 1010 and data record 1042 indicate that the account with credit card number "555555550011" was given a new credit card number "999999990011" in the credit card system. Rows 1014 of table 1010 and 1032 of table 1030 indicate that a new customer account was opened for "Lynn Nelson" and that credit card number "121212120011" is associated with the new account in the credit card system. Row 1022 of table 1020 indicates a new transaction associated with the new account. Mapping data structure 1050 was updated as described above with respect to FIG. 8 and comprises, accordingly, an updated row 1052 and a new row 1054.

FIGS. 11A–D, in the following collectively referred to as FIG. 11, show an exemplary relational view of a database 1100. Database 1100 illustratively represents database 1000, which has been updated. In more detail, database 1100 comprises tables 920,1020,1030 and 1040 of FIG. 10, mapping data structure 1150 and tables 1110 and 1130.

Tables 1110 and 1130 represent tables 710 of FIG. 7 and 930 of FIG. 10, which have been updated. In the following, only the updates will be described in more detail in the light of the above description. Data record 1112 of table 1110 indicates that the reward card number "000000000011" was updated to reward card number "111111110011" in the reward system and, thus, reflects the current credit card number associated with the corresponding account in the credit card system, as described with respect to FIG. 6. Rows 1114 and 1116 of table 1110 and rows 1132 and 1134 of table 1130, respectively, indicate that new customer accounts were opened for "Lynn Nelson" and "Mike Golding" and that reward card numbers "121212120011" and "131313130011" are associated with the new accounts, respectively. Mapping data structure 1150 was updated as described above with respect to FIG. 8 and comprises, accordingly, new rows 1152 and 1154.

Some of the foregoing embodiments are described with reference to data warehouses. However, it should be appreciated that the invention is not limited to use in the context of a data warehouse. Furthermore, the invention is not limited to tables comprising data records in a relational database and/or replicating/extracting data from data sources to tables in a data warehouse. Therefore, the described embodiments should be understood as being rather exemplary for purposes of illustration and are, however, not intended to limit the invention thereto. Instead, the invention is intended for use in correlating any type of data from at least a first and a second data source via a mapping data structure, the data representing a data record or comprising at least one data record.

While the foregoing is directed to embodiments of the present invention, other and further embodiments of the invention may be devised without departing from the basic scope thereof, and the scope thereof is determined by the claims that follow.

What is claimed is:

1. A method of correlating at least a first plurality of data records and a second plurality of data records stored in a computer database, each data record of the first plurality of data records being uniquely identified within a corresponding data source by an associated internal identifier and each data record of the first and second plurality of data records comprising at least one external identifier, the method comprising:

receiving the first and second plurality of data records, wherein the first plurality of data records is received from a real-time data source and the second plurality of data records is received periodically from a non real-time data source;

determining a data record of the first plurality of data records and at least one data record of the second plurality of data records having an identical external identifier;

mapping the at least one determined data record of the second plurality of data records to the internal identifier associated with the determined data record of the first plurality of data records; and storing the mapping in storage.

2. A method of creating a data warehouse mapping data structure stored on computer readable storage media to correlate at least two different data sources, the method comprising:

creating a plurality of mapping data records, each mapping data record comprising:

a first value representing an internal identifier uniquely identifying the mapping data record in the warehouse mapping data structure;

a second value representing an external identifier of one of a data record of a first data source, wherein the first data source comprises a real-time data source, and a data record of a second data source, wherein the second data source comprises a non real-time data source; and a third value representing an internal identifier uniquely identifying a data record of the second data source in the second data source, the data record of the second data source having the second value as external identifier;

whereby a correlation between the first and the second data sources is established; and storing the plurality of mapping data records in the warehouse mapping data structure.

3. A method of correlating data from at least two different data sources stored on computer readable storage media in a data warehouse, the method comprising:

loading data from a first data source, wherein the first data source comprises a real-time data source, into the data warehouse, the data from the first data source comprising a plurality of first internal identifiers and a plurality of first external identifiers;

creating a warehouse mapping data structure on the basis of the plurality of internal identifiers each mapped to an associated first external identifier;

loading data from a second data source, wherein the second data source comprises a non-real time data source, into the data warehouse, the data from the second data source comprising a plurality of second internal identifiers each associated with a second external identifier, wherein at least one of the associated second external identifiers is identical to one of the first external identifiers;

mapping each second internal identifier associated with a second external identifier that is identical to one of the first external identifiers in the warehouse mapping data structure to the first internal identifier of the identical matching first external identifier, whereby a correlation between data of the first and the second data sources is established; and storing the warehouse mapping data structure.

4. A computer-readable storage medium comprising computer-executable instructions which, when run on a computer system, perform an operation, comprising:

correlating at least a first plurality of data records and a second plurality of data records, wherein the first plurality of data records is received from a real-time data source and the second plurality of data records is received periodically from a non real-time data source, and wherein each data record of the first plurality of data records is uniquely identified within a corresponding data source by an associated internal identifier and each data record of the first and second plurality of data records comprising at least one external identifier, the correlating comprising:

determining a data record of the first plurality of data records and at least one data record of the second plurality of data records having an identical external identifier; and mapping the at least one determined data record of the second plurality of data records to the internal identifier associated with the determined data record of the first plurality of data records; and storing the mapping.

5. The computer-readable medium of claim 4, wherein the determining comprises:

for each data record of the first plurality of data records:
retrieving the associated internal identifier from the data record;
retrieving the at least one external identifier from the data record; and wherein the mapping the at least one determined data record comprises:
creating a mapping data record in a mapping data structure, the mapping data record comprising the retrieved associated internal identifier and the at least one retrieved external identifier.

6. The computer-readable medium of claim 5, wherein the determining further comprises, for each data record of the second plurality of data records:
retrieving an internal identifier associated with the data record, the retrieved internal identifier uniquely identifying the data record of the second plurality of data records within a corresponding data source;
retrieving the at least one external identifier from the data record; and
comparing the at least one retrieved external identifier with the at least one external identifier of each mapping data record in the mapping data structure; and wherein the mapping further comprises, if the at least one retrieved external identifier matches an external identifier of a specific mapping data record in the mapping data structure:

copying the retrieved internal identifier and an indication of the corresponding data source to the mapping data record.

7. The computer-readable medium of claim 6, wherein the mapping further comprises, if the at least one retrieved external identifier does not match an external identifier of any mapping data record in the mapping data structure:

associating an available internal identifier with the data record of the second plurality of data records, the available internal identifier uniquely identifying the data record within the mapping data structure; and copying the associated available internal identifier, the retrieved external identifier and an indication of the corresponding data source to the mapping data structure; and creating a new mapping data record in the mapping data structure, the new mapping data record comprising the associated available internal identifier, the retrieved external identifier and the indication of the corresponding data source.

8. A computer-readable storage medium comprising computer-executable instructions for performing, when run on a computer system, an operation, for correlating data records, comprising:

creating a data warehouse mapping data structure to correlate data records from at least two different data sources, the correlating comprising:

creating a plurality of mapping data records in the warehouse mapping data structure, each mapping data record comprising:

a first value representing an internal identifier uniquely identifying the mapping data record in the warehouse mapping data structure;

a second value representing an external identifier of one of a data record of a first data source, wherein the first data source comprises a real-time data source, and a data record of a second data source, wherein the second data source comprises a non real-time data source; and a third value representing an internal identifier uniquely identifying a data record of the second data source, the data record of the second data source having the second value as the external identifier;

whereby a correlation between the first and the second data sources is established; and storing the data warehouse mapping data structure.

9. The computer-readable medium of claim 8, wherein the first value comprises an internal identifier uniquely identifying the data record of the first data source in the first data source.

10. The computer-readable medium of claim 8, wherein loading data from the real-time data source comprises replicating the data into the data warehouse.

11. The computer-readable medium of claim 10, wherein replicating the data into the data warehouse comprises:

monitoring the data in the real-time data source; and
if a portion of the data has changed, launching a replication program suitable for copying the portion of the data into the data warehouse.

12. The computer-readable medium of claim 8, wherein the operation further comprises:

loading the data from the second data source from an extracted data source into the data warehouse.

13. The computer-readable medium of claim 12, wherein loading data from the extracted data source comprises extracting the data to the data warehouse.

14. The computer-readable medium of claim 13, wherein extracting the data to the data warehouse comprises:
launching an extraction program suitable for copying the data into the data warehouse.

15. The computer-readable medium of claim 8, wherein loading data from the real-time data source comprises replicating the data into the data warehouse; and loading data from the second data source comprises extracting the data to the data warehouse.

16. The computer-readable medium of claim 15, wherein replicating the data into the data warehouse comprises:
monitoring the data in the real-time data source; and
if a portion of the data has changed, launching a replication program suitable for copying the portion of the data into the data warehouse; and
wherein extracting the data to the data warehouse comprises:
launching an extraction program suitable for copying the data into the data warehouse.

17. The computer-readable medium of claim 8, wherein the operation further comprises:
replicating the data from the first data source from a real-time data source into the data warehouse;
for each data record in the replicated data:
copying an internal identifier uniquely identifying the data record in the first data source from the data record to the first value in a mapping data record;
copying the external identifier from the data record to the second value in the mapping data record;
extracting the data from the second data source from an extracted data source to the data warehouse;
for each data record in the extracted data:
comparing the external identifier of the data record with the second value in each created mapping data record; and
if the external identifier of the data record matches the second value in a specific mapping data record:
copying the internal identifier from the data record in the extracted data to the third value in the specific mapping data record.

18. The computer-readable medium of claim 8, wherein the operation further comprises:
extracting the data from the second data source from an extracted data source to the data warehouse;
for each data record in the extracted data:
comparing the external identifier of the data record with the second value in each created mapping data record; and
if the external identifier of the data record matches the second value in a specific mapping data record:
copying the internal identifier from the data record in the extracted data to the third value in the specific mapping data record; and
if the external identifier of the data record does not match the second value in a mapping data record:
creating a new mapping data record;
attributing a first value to the new mapping value; and
copying the external identifier from the data record to the second value in the new mapping data record.

19. A computer-readable storage medium comprising computer-executable instructions for performing, when run on a computer system, an operation of correlating data from at least two different data sources in a data warehouse, the operation comprising:
loading data from a first data source into the data warehouse, wherein the first data source comprises a real-time data source, the data from the first data source comprising a plurality of first internal identifiers and a plurality of shared external identifiers;
creating a warehouse mapping data structure on the basis of the plurality of internal identifiers each mapped to an associated first shared external identifier;
loading data from a second data source into the data warehouse, wherein the second data source comprises a non real-time data source, the data from the second data source comprising a plurality of second internal identifiers each associated with a second external identifier;
mapping each second internal identifier associated with a second external identifier that is identical to one of the first external identifiers in the warehouse mapping data structure to the first internal identifier of the identical matching first external identifier, whereby a correlation between data of the first and the second data sources is established; and
storing the mapping.

20. The computer-readable medium of claim 19, wherein loading data from the real-time data source comprises replicating the data into the data warehouse.

21. The computer-readable medium of claim 20, wherein replicating the data into the data warehouse comprises:
monitoring the data in the real-time data source; and
if a portion of the data has changed, launching a replication program suitable for copying the portion of the-data into the data warehouse.

22. The computer-readable medium of claim 19, wherein loading data from the second data source into the data warehouse comprises loading the data from an extracted data source.

23. The computer-readable medium of claim 22, wherein loading data from the extracted data source comprises extracting the data to the data warehouse.

24. The computer-readable medium of claim 23, wherein extracting the data to the data warehouse comprises:
launching an extraction program suitable for copying the data into the data warehouse.

25. The computer-readable medium of claim 19, wherein loading data from the real-time data source comprises replicating the data into the data warehouse and wherein loading data from the second data source comprises extracting the data to the data warehouse.

26. The computer-readable medium of claim 25, wherein replicating the data into the data warehouse comprises:
monitoring the data in the real-time data source; and
if a portion of the data has changed, launching a replication program suitable for copying the portion of the data into the data warehouse; and
wherein extracting the data to the data warehouse comprises:
launching an extraction program suitable for copying the data into the data warehouse.

27. A mapping data structure residing on a computer-readable storage medium, the mapping data structure comprising a plurality of data records, each data record comprising:
a first portion comprising a warehouse internal identifier;
a second portion comprising an external identifier common to a first data source, wherein the first data source is a real time data source, and a second data source, wherein the second data source is a non-real time data source;

a third portion comprising an internal identifier of the second data source; wherein at least one data record of the plurality of data records comprises a warehouse internal identifier representing an internal identifier of the first data source, a common external identifier associated with the internal identifier of the first data source and an internal identifier of the second data source associated with the common external identifier, whereby a correlation between data of the first and the second data sources is established; and storing the mapping data structure.

28. The mapping data structure of claim 27, wherein at least one data record of the plurality of data records comprises a warehouse internal identifier that does not match any internal identifier of the first data source.

29. A computer, comprising: a memory containing at least:

a data warehouse for storing data of a first and a second data, source wherein the first data source is a real time data source, and wherein the second data source is a non-real time data source; and a mapping data structure for correlating the data of the first and second data sources in the data warehouse, the mapping data structure comprising a plurality of data records, each data record in the mapping data structure comprising:

a first portion comprising a warehouse internal identifier;

a second portion comprising an external identifier common to a first data source and a second data source; and a third portion comprising an internal identifier of the second data source; wherein at least one data record of the plurality of data records comprises a warehouse internal identifier representing an internal identifier of the first data source, a common external identifier associated with the internal identifier of the first data source and an internal identifier of the second data source associated with the common external identifier; and a processor adapted to execute contents of the memory.

30. The computer of claim 29, wherein the data warehouse and the mapping data structure are incorporated into a database management system.

31. The computer of claim 29, further comprising:

a network interface unit adapted to establish a network connection to at least one of the first and second data sources; and a receiving unit adapted to receive data from the first and second data sources.

32. The computer of claim 29, wherein the memory further comprises:

an updating system adapted to update the mapping data structure if changes in the data of the first and second data sources occur.

33. The computer of claim 32, wherein the updating system comprises:

a detecting unit for detecting the changes; and a triggering unit for performing updates.

* * * * *